Aug. 26, 1958 A. J. FITZGERALD 2,849,267

GLASS-RETAINER STRUCTURE FOR CABINET

Filed Nov. 1, 1954 2 Sheets-Sheet 1

INVENTOR:
ALBERT J. FITZGERALD,
BY Charles M. Hutchins
HIS ATTORNEY.

Aug. 26, 1958 A. J. FITZGERALD 2,849,267

GLASS-RETAINER STRUCTURE FOR CABINET

Filed Nov. 1, 1954 2 Sheets-Sheet 2

INVENTOR:
ALBERT J. FITZGERALD,
BY Charles M. Hutchins
HIS ATTORNEY.

United States Patent Office 2,849,267

Patented Aug. 26, 1958

2,849,267

GLASS-RETAINER STRUCTURE FOR CABINET

Albert Joseph Fitzgerald, Syracuse, N. Y., assignor to General Electric Company, a corporation of New York Application November 1, 1954, Serial No. 465,798

6 Claims. (Cl. 312—7)

The present invention relates generally to structures for retaining and framing glass members within a window opening and, more particularly, to improved structure for mounting the safety glass of a television receiver.

It is conventional practice to mount a protective plate or sheet of glass or transparent plastic, or the like, known as a safety-glass, between the face of a conventional cathode-ray tube display device and a viewer thereof in order to protect the viewer against the dangers of possible implosion of the cathode-ray tube. Such safety-glass may also function in known manner to filter the light comprising the television picture.

Accordingly, it is one object of the present invention to provide an improved glass retainer and framing structure for mounting a sheet of glass or the like within a window opening.

Among the problems which confront television manufacturers in assembling such safety glasses in television cabinets are those associated with the wide variation from one cabinet to another in the dimensions of the windows with respect to which the safety glass is to be mounted. This is particularly true in the case of television cabinets constructed of wood or the like whose dimensions are not generally held to very close tolerances.

It is a further object of the present invention to provide an improved adjustable structure for mounting and framing a sheet of glass or the like, within a window opening having a relatively high degree of dimensional tolerance.

Another problem encountered in the construction of such devices is that the various steps of assembling the glass retainer and framing member within a cabinet often result in mars and scratches on the surface of the retainer. Accordingly, it is still another object of the present invention to provide an improved structure for mounting and framing a glass member within a window opening which may be assembled and adjusted in position without marring its finish.

It is still another object of the present invention to provide an improved glass retainer and framing member that is relatively inexpensive to fabricate.

It is still another object of the present invention to provide an improved glass retainer and framing structure whose structure lends itself to mass-production assembly techniques.

Briefly stated, in accordance with one aspect of the present invention, there is provided a framing apparatus comprising inner corner members including a pair of angularly disposed legs joined in abutting relation at a predetermined angle. Semi-tubular outer members are fitted over the respective ones of the legs in sliding relation thereto. An outer corner member frictionally retains the semi-tubular members in position over the legs of the inner corner member and overlaps the respective outer corner members.

A further feature of the invention comprises a removable member of paper, cardboard, plastic, or the like, which may be placed between the outer corner member and the respective semi-tubular members overlapped thereby. This removable member permits sliding adjustment of the semi-tubular members with respect to the outer corner member without marring the finish of the semi-tubular members. The protective removable corner member may be withdrawn upon arrival at a desired point of adjustment.

For additional objects and advantages, and for a better understanding of the invention, attention is now directed to the following description and accompanying drawings. The features of the invention which are believed to be novel are particularly pointed out in the appended claims.

Figures 1, 2:
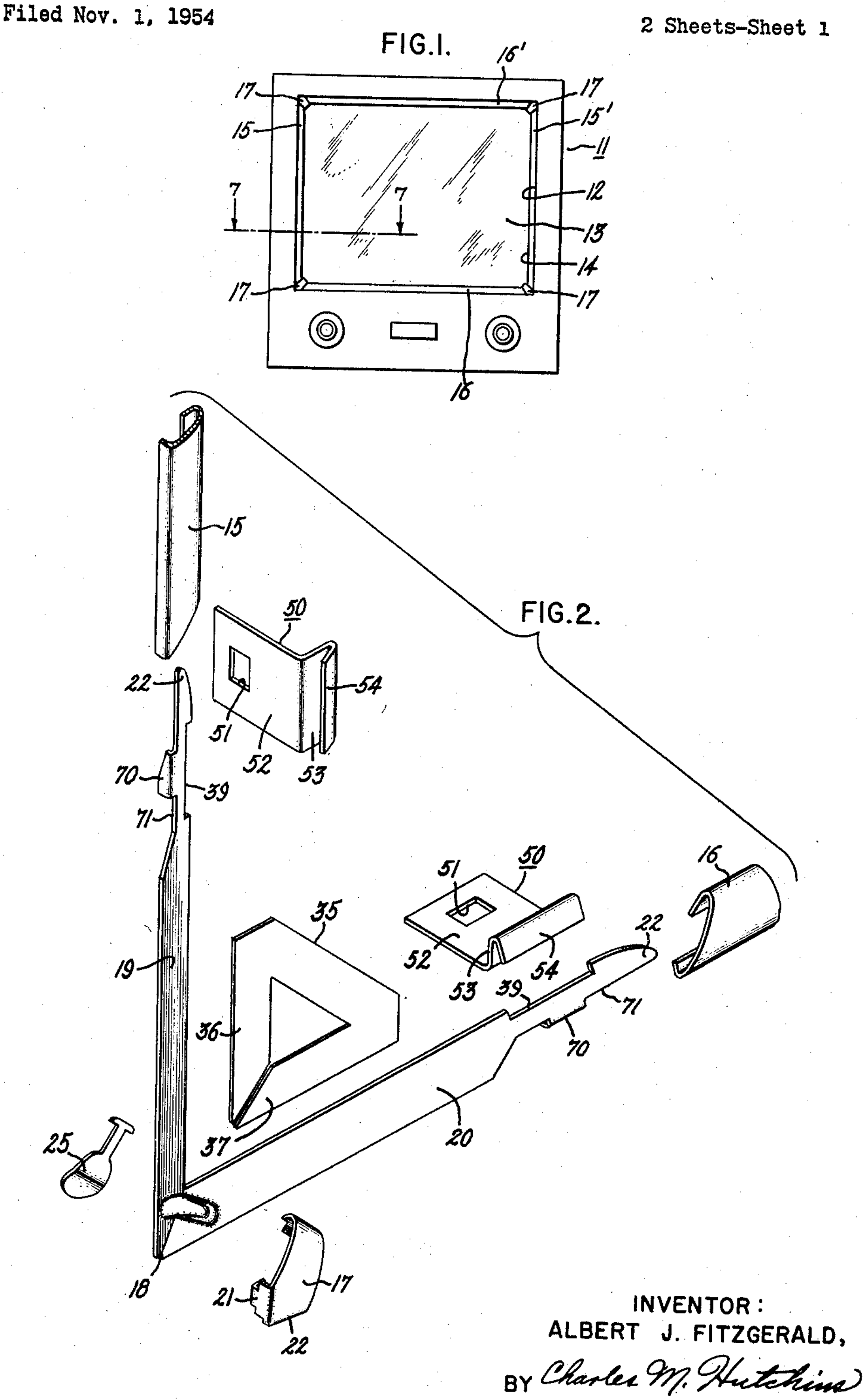
Fig. 1 is a front-elevational view of a typical television receiver embodying a glass retainer structure constructed in accordance with the teachings of the present invention.
Fig. 2 is an exploded elevational view of a portion of a glass retaining structure such as that included in Fig. 1.

Referring now to Fig. 1, there is shown at 11 a conventional table model type of television receiver including a front window opening 12 within which is mounted a safety glass 13 by means of a glass retainer 14, embodying features of the present invention.

As seen from the front, the glass retainer 14 comprises first and second vertical framing members 15 and 15′ and lower and upper horizontal framing members 16 and 16′. Four outer corner members 17 overlap the respective abutting framing members and provide a pleasant appearance to the assembled structure. For a greater appreciation of the detailed construction of the retainer structure 14, reference is made to the succeeding figures as discussed below.

Turning now to Fig. 2, it will be seen that the respective corner assemblies of the assembled retainer structure shown in Fig. 1 comprise an inner corner member 18, which in turn, is formed of a pair of angularly disposed legs 19 and 20 joined in abutting relation at a predetermined angle, which for a conventional rectangle would be a right angle. In an illustrated embodiment, the respective legs of the inner corner member 18 are formed of separate metal strips joined as by means of an additional strip of metal spot-welded at the corner. An alternative constructure would be to form the entire corner piece 18 of a unitary piece of metal. However, by forming the corner member 18 of two distinct strips certain economies of fabrication may, in some cases, be achieved. In the illustrated embodiment, the two legs of the corner member 18 are canted with respect to one another in order to provide additional rigidity to the corner structure as well as to facilitate mounting the semi-tubular outer framing members 15 and 16 over the respective inner legs 19 and 20. In the embodiment herein shown, the respective inner legs 19 and 20 are canted inwardly toward the center of the viewing area at an angle of approximately 20°–25° with respect to the plane of the safety glass (not shown in Fig. 2).

In the assembled condition, the present glass retainer structure comprises a plurality of corner structures each including a member such as the inner corner member 18, over the respective legs of which a pair of semi-tubular framing members such as 15 and 16 are slideably mounted. The outer tubular members 15 and 16 may be advantageously formed of relatively light gauge metal such as brass or the like and the outer front surface may be formed and finished as appearance requirements may dictate. The rear portion thereof is preferably provided with an open slit running along the length of the entire member, or at least along the entire length of the corner leg of the respective corner members 18. The purpose of the open slit in each of the members 15 and 16, as will be seen in greater detail below, is to permit easy assembly of the tubular member over the respective leg consistent with the provision of a mounting clip 50 to be described in greater detail below.

When mounted on the corner member 18, the semi-tubular members 15 and 16 are preferably provided with tapered abutting ends, as shown, in order to provide a mitered joint. Although it is not essential that the mating or adjacent ends of the respective members 15 and 16 actually abut against one another, to permit maximum adjustment along the respective leg members 19 and 20, it is preferable that they be mitered as shown.

An outer corner member 17 overlaps the respective adjacent ends of the semi-tubular members 15 and 16 when in the assembled position. The outer corner members 17 comprises a tapered inner portion that is bent inwardly to form an inner tab portion and a pair of outer tab portions 21 and 22 (not shown) being bent downwardly and to the rear of the corner joint. The axis of these two bends preferably making an angle with respect to one another that corresponds to that made by the outer portion of the inner corner member 18. A spring clip member 25 engages the inner tab and respective outer tabs of the member 17 and thereby clamps and frictionally retains the outer corner member 17 in its assembled position with respect to the semi-tubular members 15 and 16 and the inner corner member 18.

A removable paper isolating member 35 is provided for insertion between the inner surface of the outer member 17 and the two respective outer surfaces of the semi-tubular members 15 and 16 when in the assembled position. This structure is shown in greater detail in Figs. 3 and 4 below.

The isolating member 35 may preferably comprise a relatively thin sheet of cardboard, or the like, having suitable tear-resistance to be positioned and withdrawn from the isolating position between the outer corner member 17 and the respective leg members 15 and 16. The member 35 may conveniently comprise a triangular member having an opening cutout of its center to provide a pair of legs 36 and 37 for insertion as indicated between the corner clamping member 17 and the respective legs 15 and 16. A slit is provided between the members 36 and 37 of the isolating member 35 in order to permit assembly and disassembly of the corner member as discussed in greater detail below.

Figure 3:
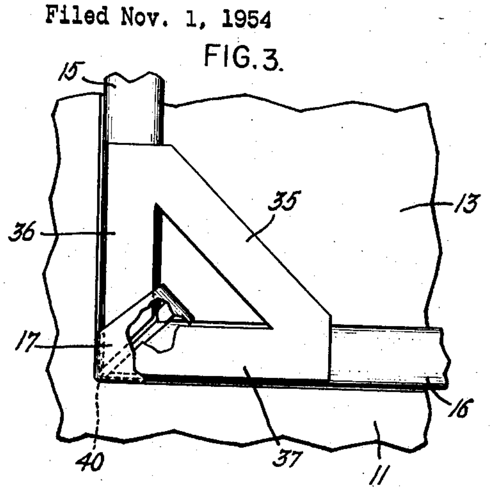
Fig. 3 is a front-elevational view, partly in cross-section, of a portion of a glass retaining structure embodying features of the invention.
Figure 4:
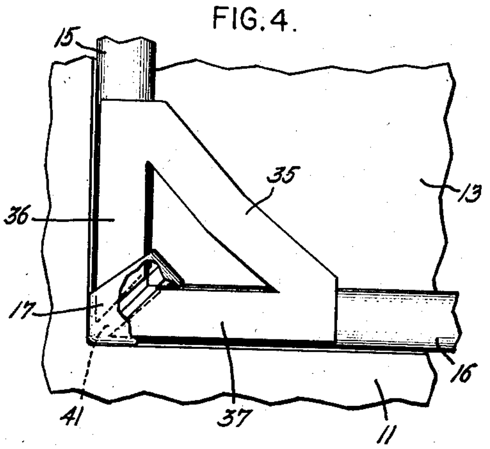
Fig. 4 is another front-elevational view, partly in cross-section, of a portion of a glass retainer structure embodying features of the invention.

Referring to Fig. 3 it is seen that the removable member 35 may be conveniently retained in position by resilient pressure exerted between the members 15 and 16 respectively and the outer corner members 17. This resilient pressure is such as to permit the members 15 and 16 to be moved along their axis and along the respective legs 19 and 20 (not shown) upon which they are mounted in order to provide adjustment of the assembled structure. This feature of adjustment may be better seen by comparing the gap 40 separating the members 15 and 16 with the gap 41 shown in Fig. 4 separating the same two members 15 and 16. It will be apparent that the corner member 17 completely overlaps the gap just provided, therefore, conceals from the viewer any variation that may exist in the gap.

Figure 5:
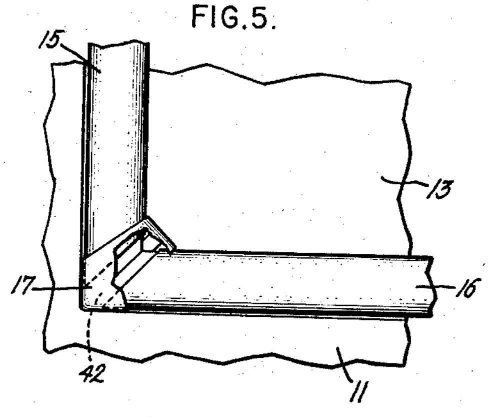
Fig. 5 is still another front-elevational view, partly in cross-section, showing a portion of a glass retainer structure embodying features of the invention.

The isolating member 35 may conveniently be removed upon arrival at a desired point of adjustment merely by sliding it from its assembled position, as illustrated. One of the advantages offered by this configuration is the ease of adjustment due to the fact that the members 15 and 16 respectively may be moved with respect to member 17 without damaging the surface of the members 15 and 16. Thus, the semi-tubular members 15 and 16 may be assembled in a finished condition, i. e., final lacquering and other finishing of the surface of the framing members of the glass retaining structure may be accomplished before assembling without danger of marring the structure during adjustment of the corner members as indicated above. A further illustration of the relative gap between the members 15 and 16 may be seen by reference to Fig. 5. It will be seen that the gap 42 of Fig. 5 is larger than that of either Fig. 3 or 4. In Fig. 5 the removable paper member 35 is not shown, having been removed upon arrival at the desired point of adjustment.

The resilient pressure between the members 15 and 16 respectively, and member 17 is sufficiently firm to maintain their relative position constant, whether the isolating member 35 is in position or not.

Figure 6:
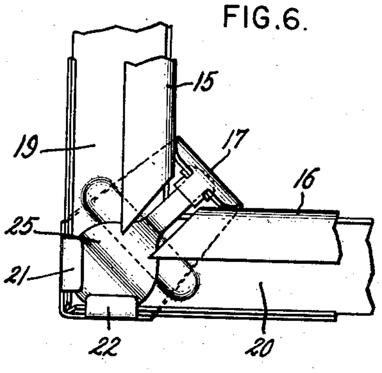
Fig. 6 is a rear-elevational view, partly in cross-section, of a portion of a glass retainer structure embodying features of the invention; and, Fig. 7 is a plan view, partly in cross-section, taken through the lines 7—7 of the television receiver shown in Fig. 1.

Referring now to Fig. 6 there is shown a rear-view of the assembled corner structure, including the member 18, the respective semi-tubular member 15 and 16, the outer corner member 17, and the spring clip member 25. As may be seen from this figure, the spring clip 25 may advantageously comprise a circular end portion having a comparatively narrow neck portion connecting with a tab at its other end. The circular end portion is engaged by the respective outer tabs of the outer portion of the outer corner member 17 and the tab on the opposite end is engaged by the tab on the inner portion of the member 17. The comparatively thin neck portion of the spring 25 permits the semi-tubular members 15 and 16 to be assembled in relatively close proximity to one another.

Figure 7:
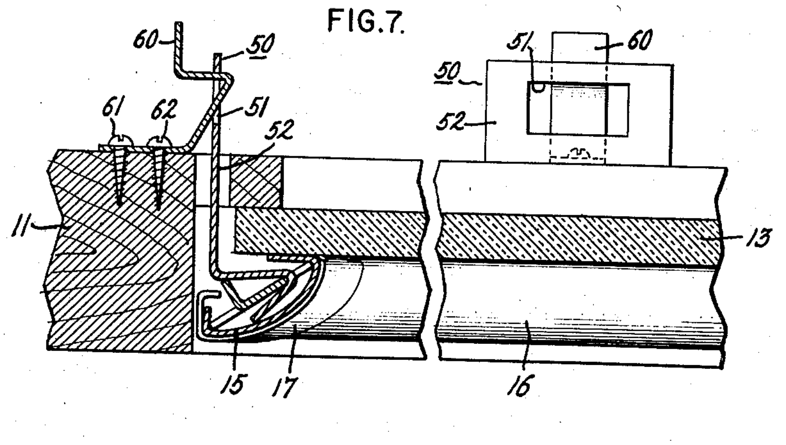

Referring now to Fig. 7 it will be seen that the glass retaining structure may be mounted within a television receiver cabinet 11 by means of the mounting clips 50 in conjunction with spring mounting members 60 in the form of camming spring members mounted to the inside surface of the front of the cabinet 11 by fastening means such as the two screws 61 and 62. The members 60 are adapted to engage a generally rectangular aperture 51 in the mounting clip 50. The mounting clip 50 comprises a relatively flat body portion 52, and an end portion adapted to engage the recess 71 in the respective leg member 19 engaged thereby.

With further reference to the details of the clip member 50, it is pointed out that this member comprises a flat body portion 52 provided with rectangular aperture 51, substantially transverse end portion 53 and a second end portion 54 that is bent back upon the transverse portion 53 in order to provide a recess therebetween for engaging the leg to which it is to be mounted.

In the assembled position, as shown in Fig. 7, the recess of the clip 50 engages the reduced portion 39 of the leg 19. In this position, the outer semi-tubular member 15 may be positioned over the leg 19 such that the flat body portion of the member 50 extends through the slit in the semi-tubular member 15 as the member 15 is slid over the leg 19. In order to assure rigidity of the assembled structure, the leg 19 is provided with a tab member 70 bent back preferably transverse to the plane of its flat dimension in order to provide a stop for the member 50. The member 70 may be tapered, as shown in Fig. 2, in order to facilitate assembly of the semi-tubular member 15 over the leg 19. In order further to facilitate such assembly, the outside portion of the leg 19 is preferably provided with a recess portion 71 as illustrated in Fig. 2, the tab 70 preferably being bent back about an axis along the edge of this recess portion 71. When the outer member 15 is in its assembled position over the leg 19, as will be seen by reference to Fig. 7, the second bent portion of the clip 50 may advantageously contact the inside of the semi-tubular member 15 and the inside portion of the first transverse portion of the clip 50 may conveniently rest against the tab 70 of the leg 19.

With further reference to Fig. 7, it is seen that the safety glass 13 is retained within the television receiver cabinet 11 by means of a framing structure including members 15, 16 and 17 and that the safety glass 13 is prevented from moving inwardly toward the interior of the television set by a molding strip 75 which forms part of the cabinet itself. An aperture or slit 76 through the molding 75 provides access for the clip 50 to be inserted for engagement by the camming spring member 60, as described above.

As is believed apparent from the foregoing, applicant's improved mounting structure provides unique and efficient means for mounting the safety glass of a television receiver or the like within a window opening of a television receiver. Other uses for applicant's structure will occur to those skilled in the art. Applicant's structure offers many advantages, for example it may be constructed quickly and efficiently of relatively inexpensive parts while, nevertheless, performing its functions fully. The completed structure is also capable of providing a pleasant appearance to the television receiver to which it is mounted.

It is pointed out that among the features of the present invention is the fact that it is adjustable four ways, i. e., all four corners, being similarly constructed, have two-way adjustment without leaving scratches or other mars on the outside face of the material employed for its construction. Thus, the construction material may be completely prefinished as by lacquering, buffing, or the like.

It will be apparent that this four-way adjustment enables installation of a glass retainer within a cabinet window other than a pure rectangle, thereby emphasizing its usefulness in overcoming variations in cabinet window openings.

One of the advantages of the easy assembly provided by the present structure is that its component parts may be shipped from place to place in its disassembled condition and be assembled readily at the place of assembly of the finished television receiver.

The unique feature of the invention permits the use of relatively light-gauge metal or the like in its construction and also eliminates the use of solder connections, thereby permitting wide choice in the use of metals and other materials from which it is to be fabricated. This avoids many known problems which might otherwise exist if solder or welding techniques were required in assembling the finished item.

It is also pointed out that the assembled structure is relatively free of vibration and thus provides a stable, firm mounting unit capable of assuring secure mounting of a safety glass within a window opening of a television receiver.

While specific embodiments have been shown and described, it will, of course, be understood that various modifications may be made without departing from the principles of the invention. The appended claims are, therefore, intended to cover any such modifications within the true spirit and scope of the invention.

What I claim as new and desire to secure by Letters Patent of the United States is:

1. A framing apparatus for mounting a sheet of material with respect to a window opening comprising an inner corner member including first and second angularly disposed legs joined in abutting relation at a predetermined angle, first and second semi-tubular outer members fitted over respective ones of said legs in sliding relation thereto and in end abutting relation with respect to each other, an outer corner member in overlapping relation with respect to the abutting ends of said semi-tubular outer members, and a spring member coacting with said inner corner member, the abutting ends of said semi-tubular outer members, and said outer corner member for resiliently maintaining all of said members in assembled relation and said outer corner member in slidable overlapping contact with the ends of said two semi-tubular outer members.

2. A framing apparatus as set forth in claim 1 including mounting clips for mounting said framing apparatus on a window opening fitted to the legs of said inner corner member and projecting through longitudinal slits provided in the respective semi-tubular outer member fitted over each of said legs.

3. The device of claim 1 wherein an isolating member comprising a relatively thin sheet of tear-resistant material is positioned between the respective semi-tubular outer members and the outer corner member.

4. In a television receiving apparatus including a cabinet having a viewing window, a framing apparatus comprising an inner corner member including first and second angularly disposed legs joined in abutting relation at a predetermined angle, first and second semi-tubular outer members fitted over respective ones of said legs in sliding relation thereto, an outer corner member in overlapping relation with respect to semi-tubular outer members, means for resiliently maintaining said outer corner member in overlapping contact with said two outer members, and clip members coacting with the legs of said inner corner member and the respective semi-tubular outer member for strengthening the assembled framing apparatus and for mounting said framing apparatus to said cabinet.

5. A glass retaining apparatus for maintaining a window pane or the like in a window frame including means for preventing a pane to be retained from moving inwardly within the window frame in one direction and wherein said glass retaining apparatus is provided for preventing a window pane from moving outwardly in the opposite direction, said glass retaining apparatus comprising in combination an inner corner member including first and second angularly disposed legs joined in abutting relation at a predetermined angle, first and second semi-tubular outer members fitted over respective ones of said legs in sliding relation thereto, an outer corner member in overlapping relation with respect to the semi-tubular outer members, said outer corner member including inner and outer tabs, and clamping means for maintaining said outer corner member in overlapping contact with said two corner members, said clamping means including a resilient spring member in engagement with the tabs of said outer corner member and the rear of said inner corner member and being adapted and arranged to exert clamping pressure between the inner corner member and the respective tabs, and means for mounting said framing apparatus within a window frame in abutting relation against a window to be retained thereby.

6. A framing apparatus for mounting a sheet of material with respect to a window opening comprising an inner corner member including first and second angularly disposed legs joined in abutting relation at a predetermined angle, first and second semi-tubular outer members fitted over respective ones of said legs in sliding relation thereto and in end abutting relation with respect to each other, an outer corner member in overlapping relation with respect to the abutting ends of said semi-tubular outer members, a spring member coacting with said inner corner member, the abutting ends of said semi-tubular outer members, and said outer corner member for resiliently maintaining all of said members in assembled relation and said outer corner member in slidable overlapping contact with the ends of said two semi-tubular outer members, and a clip member coacting with the legs of said inner corner member and the respective semi-tubular outer member for strengthening the assembled framing apparatus and for mounting said framing apparatus to said window opening.

References Cited in the file of this patent

UNITED STATES PATENTS

| | | |
|---|---|---|
| 2,075,677 | Toney | Mar. 30, 1937 |
| 2,259,434 | Blodgett | Oct. 21, 1941 |
| 2,589,986 | Bosshard | Mar. 18, 1952 |
| 2,618,695 | Ackerman | Nov. 18, 1952 |
| 2,692,983 | Eisenkramer | Oct. 26, 1954 |